United States Patent
Kässi

[11] Patent Number: 6,061,892
[45] Date of Patent: May 16, 2000

[54] METHOD FOR JOINING METAL PARTS BY ROLL FORMING FOR MANUFACTURING A COOKING VESSEL

[75] Inventor: Timo Kässi, Launoinen, Finland

[73] Assignee: Rondex Oy Ltd., Helsinki, Finland

[21] Appl. No.: 08/954,546

[22] PCT Filed: Apr. 19, 1996

[86] PCT No.: PCT/FI96/00214

§ 371 Date: Oct. 20, 1997

§ 102(e) Date: Oct. 20, 1997

[87] PCT Pub. No.: WO96/33031

PCT Pub. Date: Oct. 24, 1996

[30] Foreign Application Priority Data

Apr. 20, 1995 [FI] Finland ..................... 951883

[51] Int. Cl.[7] .................................................. B21D 39/00
[52] U.S. Cl. .......................................... 29/505; 220/912
[58] Field of Search ................ 29/505, 521, 522.1, 29/527.2, 527.3; 220/912

[56] References Cited

U.S. PATENT DOCUMENTS

| | | | |
|---|---|---|---|
| 2,290,554 | 7/1942 | Hack . | |
| 2,472,767 | 6/1949 | Zetka | 29/521 X |
| 3,131,471 | 5/1964 | Nieter | 29/521 |
| 3,599,318 | 8/1971 | Behlen | 29/521 X |
| 4,247,346 | 1/1981 | Maehara et al. | 29/505 X |
| 5,345,667 | 9/1994 | Coppier . | |
| 5,430,928 | 7/1995 | Flamming | 29/505 X |
| 5,506,062 | 4/1996 | Flammang . | |

FOREIGN PATENT DOCUMENTS

| | | | |
|---|---|---|---|
| 715630 | 12/1941 | Germany . | |
| 900842 | 7/1962 | United Kingdom | 29/521 |

*Primary Examiner*—David P. Bryant
*Attorney, Agent, or Firm*—Altera Law Group LLC

[57] ABSTRACT

A method for joining two or more metal parts (1, 2) together. According to the invention, the joining is carried out by using roll forming techniques by placing the metal parts (1, 2) on top of each other on the form face (7) of a tool (4) which is made to rotate, and by arranging the topmost part (1) in linear roll contact with a forming tool (6) which is also in rotational movement, whereby the malleable deformation of the metal in the slot between the tools integrates the parts together. A mesh or perforated plate (2) of harder metal in particular can be joined to the sheet-like part (1) of a softer metal by using roll forming, by making the metal ingredient of the latter to penetrate the apertures (12) in the former. The invention can be applied in the manufacture of frying pans or other cooking vessels which are provided with induction-heated bottoms by joining, for example, a magnetic steel mesh or perforated plate to the bottom of a vessel made of aluminum, as part of the forming of an aluminum blank into the form of a vessel by using roll forming.

1 Claim, 2 Drawing Sheets

METHOD FOR JOINING METAL PARTS BY ROLL FORMING FOR MANUFACTURING A COOKING VESSEL

FIELD OF THE INVENTION

The present invention is generally related to joining two or more metal parts together. One special application of the invention is to join magnetic metal parts to non-magnetic metal parts, particularly when manufacturing cooking vessels provided with induction-heated bottoms, such as flying pans or kettles.

BACKGROUND OF THE INVENTION

Known methods for joining metal parts include the use of fasteners, such as bolts, screws or rivets, and welding and soldering. The latter methods melt the parts to form one integral body. in addition, it is known to countersink a harder metal part into a softer metal part by using linear compression exerted on the parts, whereby the joining of the parts is based on a malleable reshaping of the softer part.

The said use of mechanical fasteners as well as welding and soldering are inconvenient and time-consuming working methods. Furthermore, the finished product of these methods, as well as that of countersinking by compression, leaves a lot to be desired.

SUMMARY OF THE INVENTION

The purpose of the invention is to provide a new method for joining metal parts in which the said disadvantages of prior art are avoided. The invention is characterised in that the parts are joined by using roll forming techniques and by placing at least two metal parts on top of each other on the form face of a tool that is made to rotate, the parts on the form face being made to rotate correspondingly, and by arranging the topmost part in linear rolling contact with a forming tool which is also rotated, whereby the malleable reshaping of the metal in the slot between the tools integrates the parts.

Roll forming is a cold-moulding method in which a rolling forming tool machines the metal that is reshaped in a manner which can be compared to dough kneading. In this case, the integration of the parts is based on the thinning of the metal material and on its spreading under the forming tool, and on the smaller-size part sinking into the larger part. Roll forming is particularly well-suited for joining one or more smaller, hard metal parts to a larger part of softer metal.

Joining metal parts by roll forming is a simple and fast procedure which neither requires heating nor creates waste. It also yields a very smooth and finished appearance. One special advantage of the method is that it can be combined with the shaping of the generated, integrated metal piece in the same roll forming stage.

According to a preferred embodiment of the invention, a netlike or perforated metal part is joined to a sheet-like metal part placed on top of it by making the metal ingredient of the latter part to penetrate the openings in the former part during roll forming. Instead of an integral mesh, perforated plate or the like, small metal particles or other similar separate metal parts arranged on the form face under the said sheet-like metal part can be attached to it. In each case, the metal material of the sheet-like part fills the openings of the part that is underneath in the roll forming, or the gaps between individual particles so that, as a result, the underlying part(s) sinks (sink) in and form(s) an integral part of the thus created, joined metal body.

As already mentioned, the invention can be used to join magnetic metal parts to non-magnetic metal parts. Consequently, a magnetic steel mesh or a perforated steel plate or magnetic steel particles can be joined to an aluminium sheet-like body by roll forming. In the forming, harder steel parts sink into the softer aluminium that is reshaped in a malleable manner. The method can be applied in the manufacture of cooking vessels provided with induction-heated bottoms, such as flying pans, saucepans or kettles, in which manufacture welding or linear compression between two planar bodies have been used so far in joining a magnetic steel part to the aluminium bottom of the vessel.

It is particularly preferable to carry out the joining of the magnetic part as part of the manufacture of the cooking vessel, such as a flying pan or a kettle, based on roll forming and disclosed in the parallel FI patent application No. of the applicant. Thus the induction-heated cooking vessel can be manufactured so that a magnetic metal part, such as a metal mesh or a perforated plate, is placed on the lower tool the form face of which is shaped so that it corresponds to the outer surface of the thus created vessel, and the metal blank that forms the vessel is placed on top of the magnetic metal part, and that the lower tool and the metal parts on it are made to rotate, and an upper tool that rotates around its own axis inclined with respect to the lower tool is placed against them, the profile of the upper tool surface corresponding to the inner surface formed in the vessel, whereby the upper tool that is in linear rolling contact with the blank shapes the blank into the form of the vessel in the radial slot between the tools, while the magnetic part is sunk into the bottom of the vessel.

BRIEF DESCRIPTION OF THE DRAWING

In the following, the invention is described in detail with the aid of examples and with reference to the appended drawings in which.

DETAILED DESCRIPTION OF PREFERRED EMBODIMENT

Figure 1:
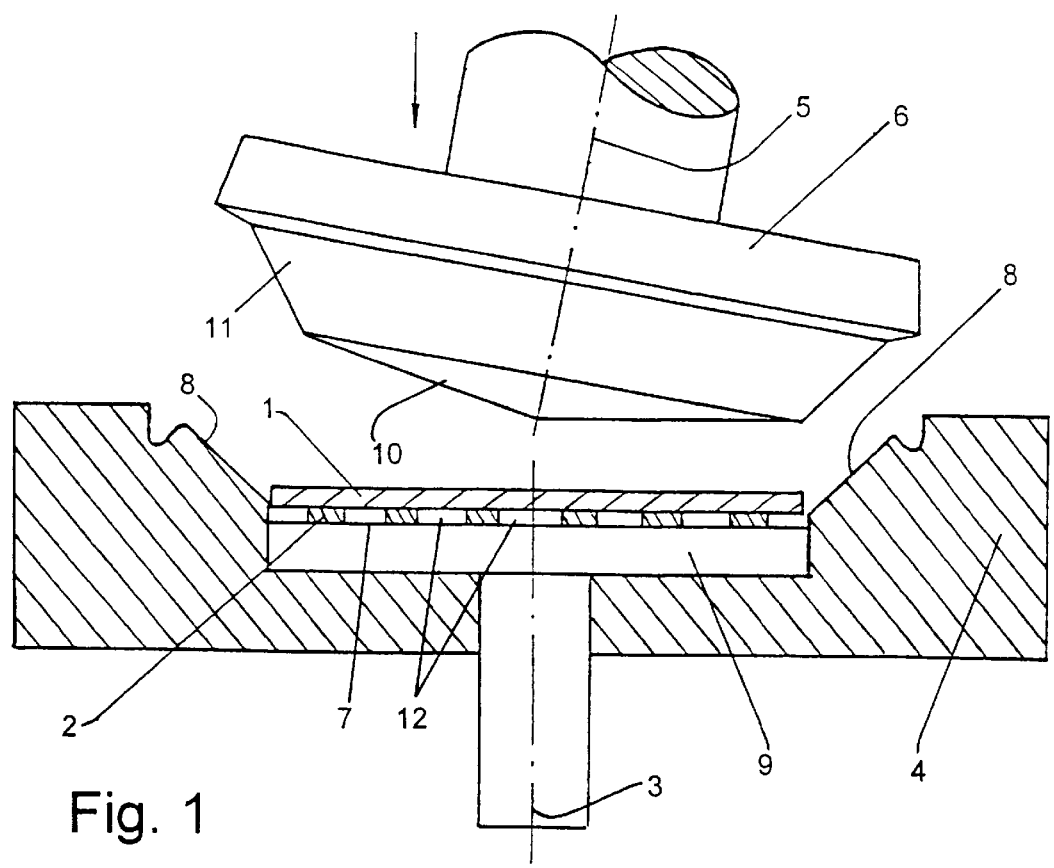
FIG. 1 presents the lower and upper tools of the roll forming equipment intended for the manufacture of a frying pan, and the perforated steel plate and the aluminium blank placed on the form face of the lower tool.
Figure 2:
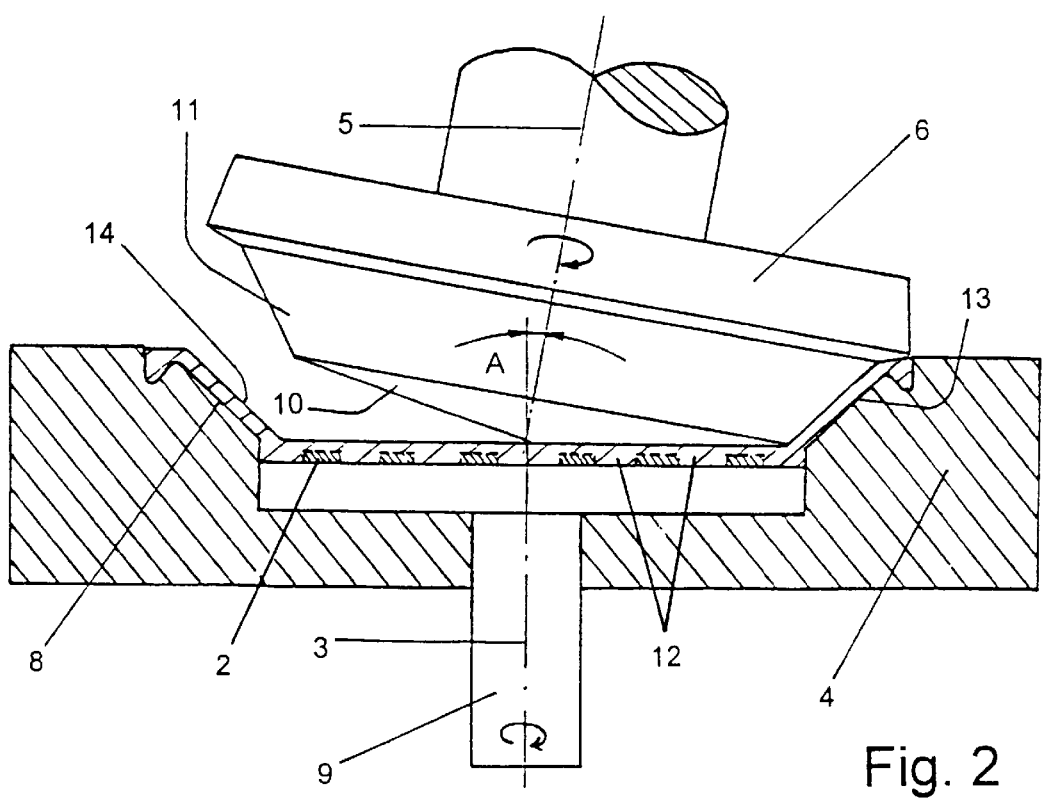
FIG. 2 presents the end result of the roll forming in which the blank has been shaped into the form of a flying pan and the perforated plate has been sunk into the bottom of the pan.

FIGS. 1 and 2 present the initial and end stages of the manufacture of a fiying pan by roll forming. The pan is manufactured from essentially round, sheet-like metal blank 1 which may be aluminium, for example, and from perforated plate 2 which is made of magnetic metal, such as steel, which is harder than the blank. The roll forming equipment consists of lower tool 4 which rotates around its axis 3 and of upper tool 6 which rotates around its axis 5. Axis 5 of upper tool 6 is inclined in angle A with respect to axis 3 of lower tool 4 (FIG. 2). Lower tool 4 comprises a form face the shape of which corresponds to the outer surface of the frying pan to be manufactured, comprising horizontal centre 7 that corresponds to the bottom of the pan, and rising edge 8 that corresponds to the outer sides of the pan. Said centre 7 of the form face is part of ejector pin 9 which moves in the direction of axis 3 included in lower tool 4, the ejector pin being used to push the completed pan out of the equipment to conclude the forming. Upper tool 6 comprises a roll surface which shapes blank 1 into the pan and consists of two parallel tapered surfaces 10, 11, which together comprise a profile that corresponds to the inner bottom and sides of the manufactured pan.

Upon placing blank 1 and perforated plate 2 on form face 7 at the beginning of the forming process, lower tool 4 is made to rotate around its axis 3 by using a motor (not shown), whereby the perforated plate and the blank rotate along with the lower tool under the influence of friction. Thereafter, upper tool 6, provided with bearings that allow free rotation, is lowered against the surface of blank 1, whereby the movement of the blank makes it rotate around its axis 5 so that the upper tool rolls on the blank in radial linear contact with its surface. In this case, the roll contact begins, as though in dough kneading, to form blank 1, providing a malleable reshaping in the blank, resulting in the metal material of the blank starting to fill apertures 12 of perforated plate 2 and to simultaneously spread radially outwards in slot 13 between the lower tool and the upper tool. The edges of the originally straight blank 1 are thus formed into the upwardly-extending sides of the flying pan. In the end stage of the roll forming according to FIG. 2, the metal material of the blank has filled apertures 12 of perforated plate 2 and the slot 13 between the lower and the upper tools completely, and has thus accomplished the final form of flying pan 14 determined by tool surfaces 7, 8, 10, and 11. Finally, upper tool 6 is removed and the completed pan 14 is lifted from the form face of the lower tool by a linear movement of ejector pin 9. To finish the manufacture of pan 14 and to obtain the final product, only handle 15 (FIGS. 3 and 4) must be attached.

Figure 3:
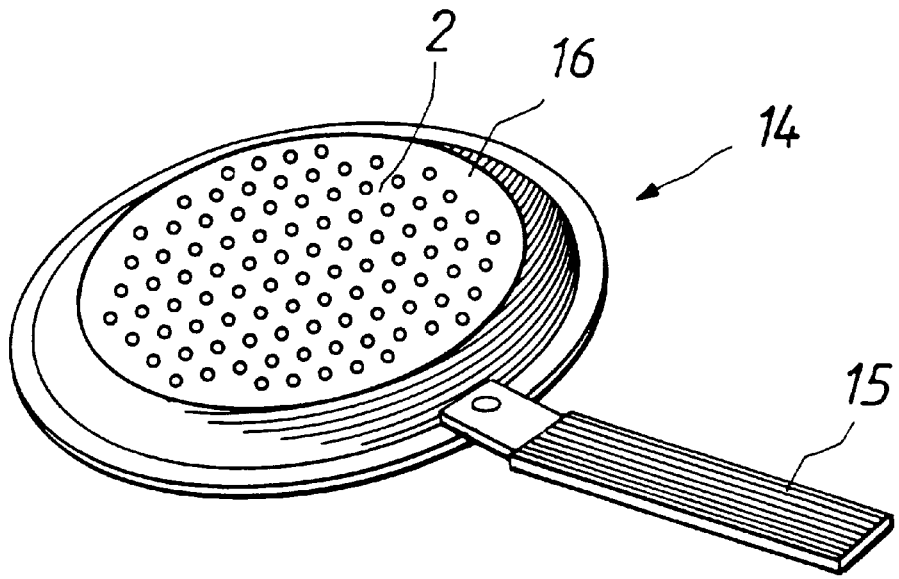
FIG. 3 presents the bottom side of the frying pan manufactured according to FIGS. 1 and 2 with its countersunk perforated plate.
Figure 4:
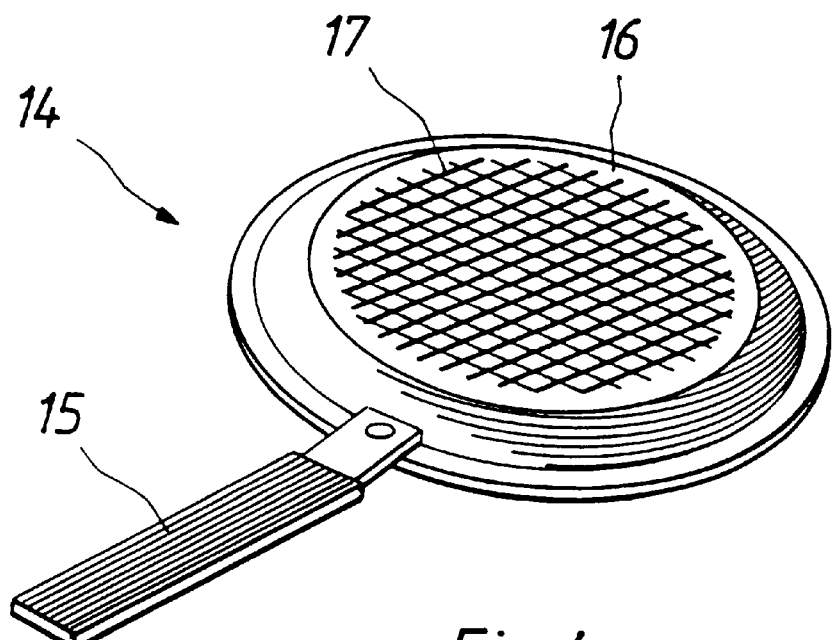
FIG. 4 presents, correspondingly, the bottom side of an alternative frying pan with a metal mesh countersunk in its bottom.

FIG. 3 presents the finished pan 14 provided with handle 15, having round perforated plate 2 of a corresponding shape sunk in its lower bottom 16. FIG. 4 shows an alternative application in which a round magnetic steel mesh 17 has been sunk in bottom 16 of pan 14.

It is clear to those skilled in the art that the different embodiments of the invention are not limited to the examples presented above but can vary within the appended Claims. Consequently, the size and shape of the magnetic perforated plate 16 or mesh 17 may vary and, instead of them, the bottom of the pan may be provided with separate sunk-in magnetic metal parts, e.g., elongated parallel filaments or granular particles. The invention is neither limited to the manufacture of flying pans only but it can be applied in other cooking vessels, such as saucepans and kettles, nor to the manufacture of cooking vessels with induction-heated bottoms, but it also comprises other joining of magnetic or non-magnetic metal parts by the roll forming techniques.

I claim:

1. A method for joining together two or more metal parts by roll forming, the method comprising:

placing at least two metal parts on top of each other on a form face of a first tool;

rotating the first tool and correspondingly the parts on the form face;

arranging an upper surface of the at least two metal parts in linear roll contact with a second tool, a slot existing between the first and second tools peripheral to the at least two metal parts; and rotating the second tool, wherein the parts are joined together by malleable reshaping of at least one of the metal parts between the tools, and a portion of at least one of the metal parts is malleably reshaped into the slot.

* * * * *